Dec. 23, 1941.   F. A. LINDBERG ET AL   2,266,877
VACUUM MIXER FOR COMMINUTED MEATS, ETC.
Filed March 7, 1940   3 Sheets-Sheet 1

INVENTORS
FRITZ A. LINDBERG.
ELMER R. LAIRD.
BY Carl C. Batz
ATTORNEY

Dec. 23, 1941.    F. A. LINDBERG ET AL    2,266,877
VACUUM MIXER FOR COMMINUTED MEATS, ETC.
Filed March 7, 1940    3 Sheets-Sheet 2

INVENTORS
FRITZ A. LINDBERG
BY  ELMER R. LAIRD
Carl C. Batz
ATTORNEY

Patented Dec. 23, 1941

2,266,877

UNITED STATES PATENT OFFICE 2,266,877

VACUUM MIXER FOR COMMINUTED MEATS, ETC.

Fritz A. Lindberg, Evanston, and Elmer R. Laird, Chicago, Ill., assignors to Armour and Company, Chicago, Ill., a corporation of Illinois Application March 7, 1940, Serial No. 322,773

5 Claims. (Cl. 259—104)

This invention relates to a vacuum mixer for comminuted meats and like materials.

An object of the present invention is to provide simple apparatus whereby comminuted or ground meat may be effectively stirred within a vacuum chamber and removed therefrom without taking the meat out of the car conveyor. A further object is to provide vacuum chamber apparatus adapted to permit a meat truck to be rolled into it and the meat stirred while still in said truck, a partial vacuum being employed to draw out the air within the meat as the same is agitated. A further object is to provide simple apparatus whereby a car or truck containing meat can be quickly passed into a vacuum chamber without obstruction, the chamber opening being sealed and a partial vacuum produced while the meat is being stirred, a second opening being provided for the removal of meat clinging to the agitating blades before withdrawal of the truck. Other specific objects and advantages will appear as the specification proceeds.

The invention is illustrated, in a preferred embodiment, by the accompanying drawings, in which—

Figure 1:
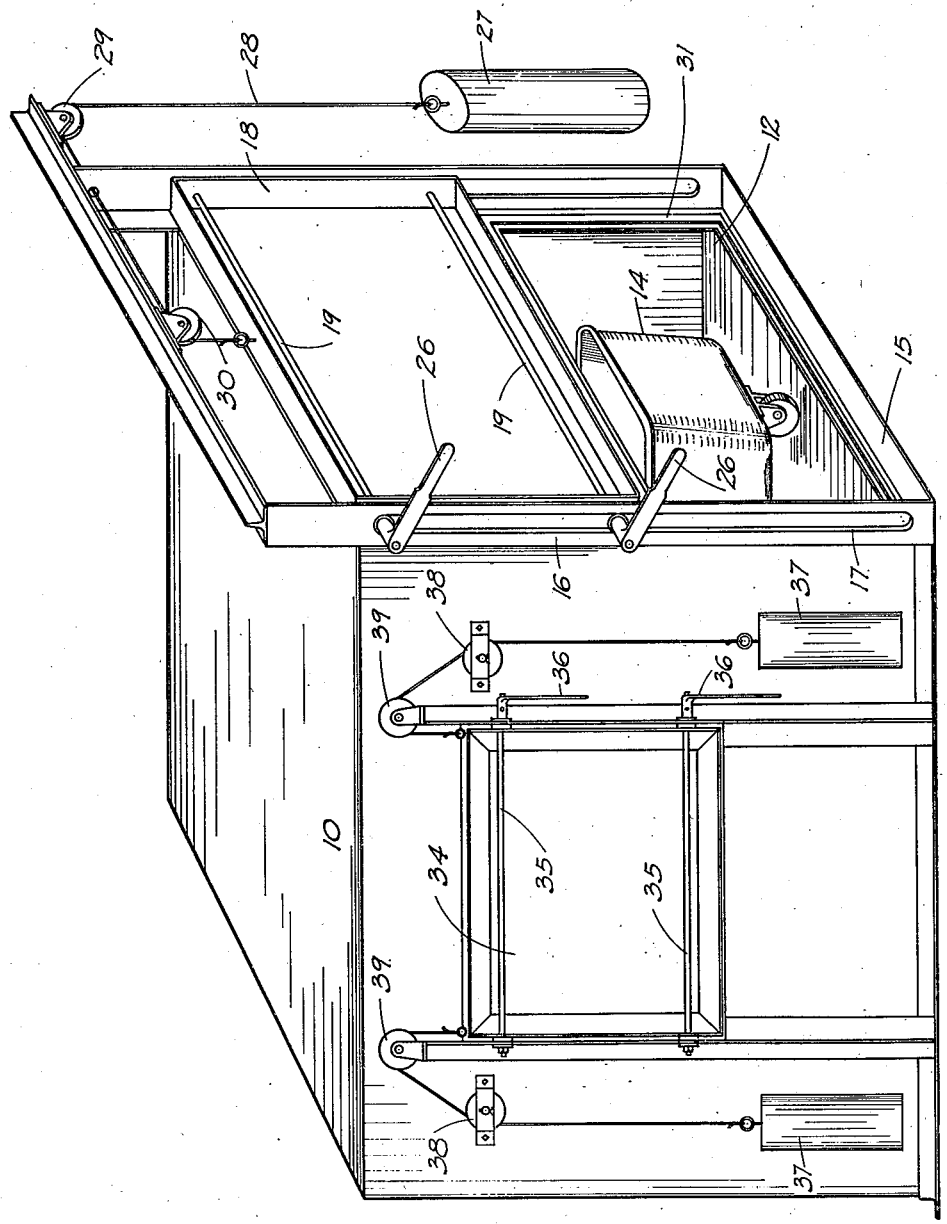
Figures 2, 3:
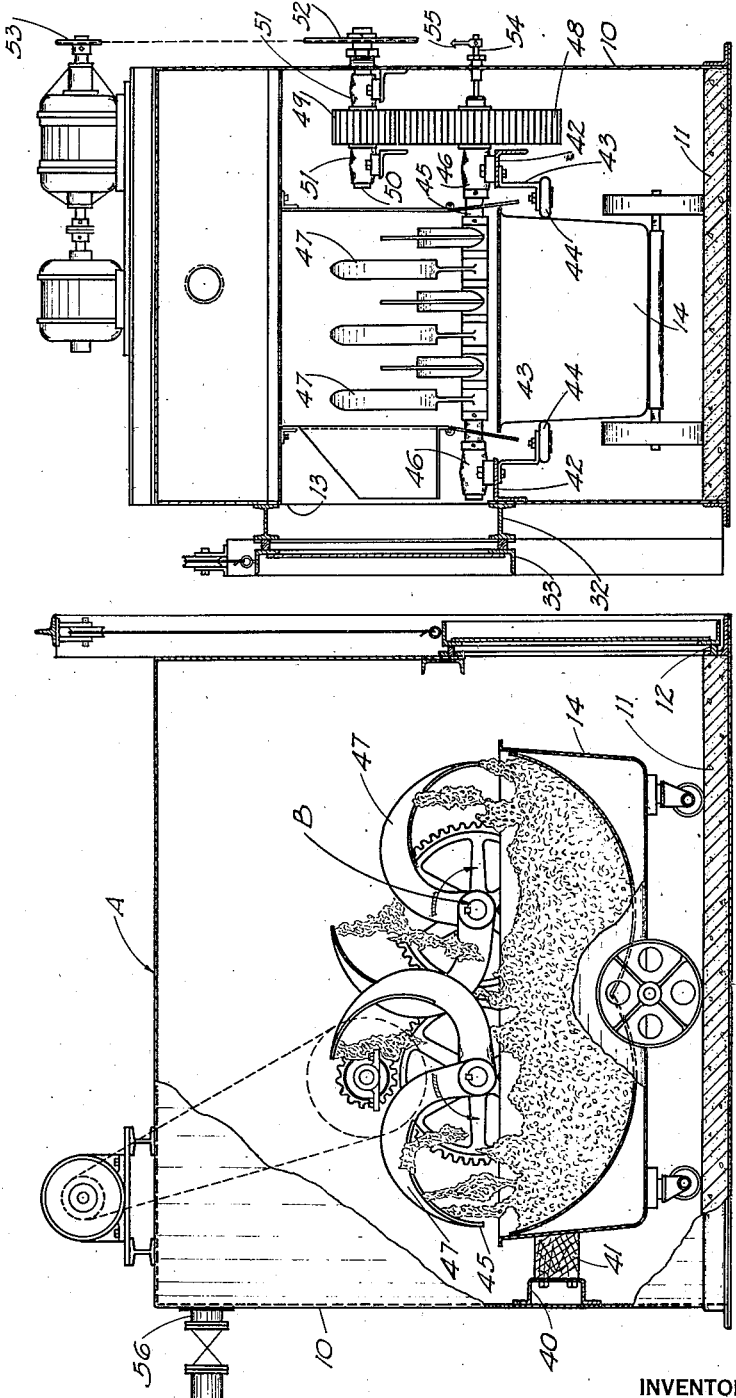
Figure 4:
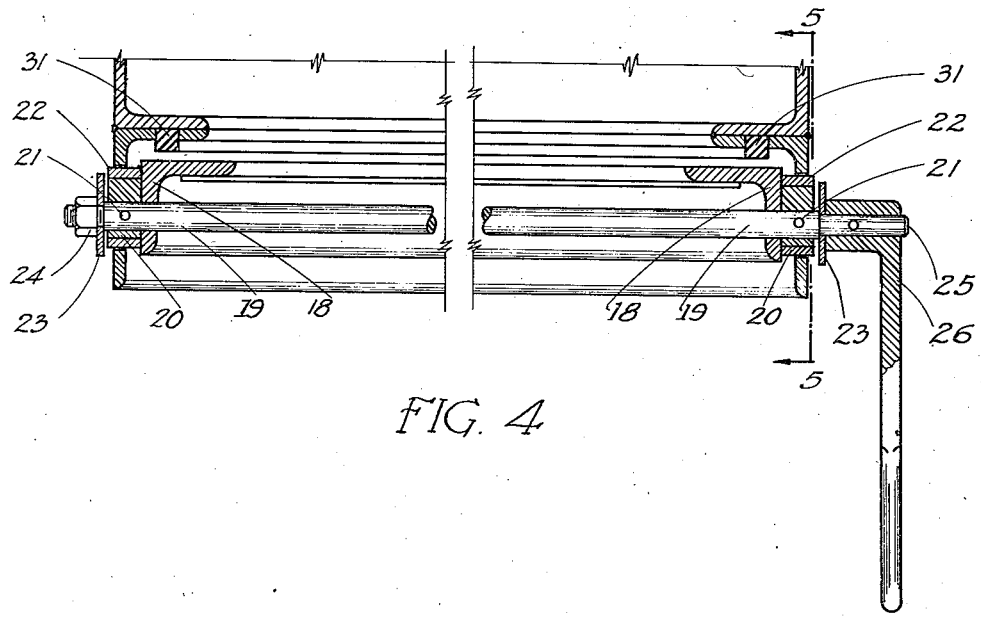
Figure 5:
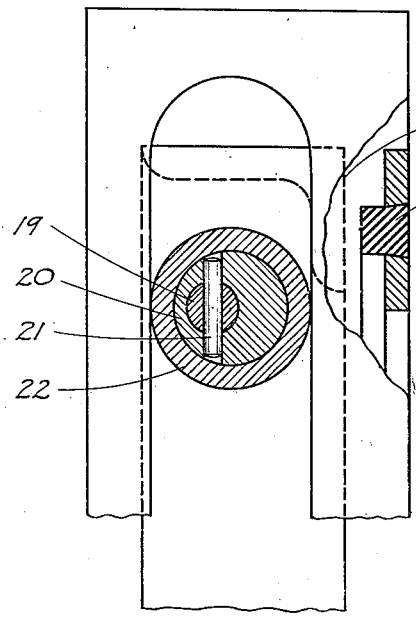

Figure 1 is a perspective view of apparatus embodying my invention; Fig. 2, a longitudinal sectional view of the vacuum chamber and stirring apparatus; Fig. 3, a transverse sectional view of the same; Fig. 4, an enlarged sectional view showing the locking means employed for closing and sealing the door; Fig. 5, an enlarged transverse sectional detail view showing the locking mechanism in position for maintaining the door in non-sealing position; and Fig. 6, a view similar to Fig. 5 but showing the eccentric means for maintaining the door in sealing position.

In the illustration given, A designates a casing providing a chamber; and B, stirring or agitating mechanism within the chamber.

The casing A may be of any suitable construction. In the illustration given, it comprises metal sides 10 which cooperate with the concrete floor slab 11 in forming an air-tight closure except for a door opening 12 in the lower portion of the front side, and a side opening 13 adjacent the stirring apparatus B. The floor 11 may be formed of metal or other suitable material, if so desired.

The front opening 12 is large enough to receive a car or truck 14 provided with rollers, which may be rolled through the open end and on to the track or path provided by the floor 11. Any suitable means for providing an airtight closure for the opening 12 may be employed. We prefer, however, to employ the following means. A rail frame 15 is provided for encircling the front side of the casing 10. The side rails 16 are provided with longitudinal slots 17. A door 18 extends between the side rails 16 and is supported upon a pair of rods 19. Each rod 19 is provided at its ends with an eccentric 20, the eccentric member 20 and the rod 19 being secured together by a pin 21. About each eccentric 20 is a roller 22. The rollers 22 are received within the slotways 17 of the side rails 16. At one end, each of the rods 19 is provided with a washer 23 and a nut 24. At the other end, which is reduced at 25, the rod 19 is secured by a pin to a handle 26 having a relatively long leverage arm. When the lever is rotated, it causes the eccentric 20 within the roller 22 to shift the rod 19 toward or away from the door frame.

The door 18 is counterbalanced by weight 27 suspended upon a flexible element 28 passing through pulleys 29 and 30, the end of the flexible element 28 being secured to the top of the door 18.

The casing 10 about the opening 12 is provided with an inset resilient sealing strip 31 which may be formed of rubber or other suitable material. When the door 18 is pressed against the sealing strip 31, an airtight seal is provided.

The window opening 13 is provided with a closure and sealing structure like that already described with respect to the door opening 12 and need not be therefore described in detail. The I-beam frame 32 extends beyond the opening 13 and a closure frame 33 similar to the closure frame 15 is supported thereby. The door 34 is likewise supported upon rods 35 identical in structure with the rods 19, and the eccentric locking and roller means operated by the handles 36 are identical with the structures 20, 21 and 22 described in connection with the door closure. The rollers likewise move vertically in slots carried by the frame 33. A pair of weights 37 extend over pulleys 38 and 39 and are secured to the top portion of the door so as to balance the weight thereof. Resilient sealing strips are employed, as has been described with reference to the door opening 12.

At the rear side of the casing is a bracket member 40 supporting a bumper block 41 which limits the inward movement of the truck or car 14.

Supported by the frame 10 are angle bars 42 extending inwardly within the chamber. Each of the members 42 carries a depending metal strap 43, to which is rotatably secured guide wheels or rollers 44. The rollers 44 engage the body of the car or truck 14 and direct it into a space in which it is properly aligned with the stirring apparatus B.

The stirring apparatus B may be of any suitable construction. In the illustration given, a pair of drive shafts 45 are mounted in bearings 46, the bearings being carried by the angle iron supports 42. From the shafts 45 extend agitating blades 47, the blades extending generally from one side of the shaft only, leaving the other side of the shaft unimpeded, thus providing a clearance for the truck or car 14, as illustrated clearly in Figs. 2 and 3. When the shafts are rotated, however, the blades dip downwardly into the contents of the truck and effectively stir or agitate it.

Any suitable means for driving the shafts 45 may be employed. In the illustration given, there is mounted on the end of each shaft 45 a gear 48 which is in turn driven by a pinion 49 carried by a shaft 50 mounted in bearings 51. The shaft 50 is provided with a sprocket wheel 52 driven by a chain extending to a power motor driven sprocket 53. One of the shafts 45 is provided with a reduced extension 54 extending through and beyond the casing wall 10 and provided with an indicator arrow 55.

Any suitable form of agitating blades may be employed. The curved blades 47 are found to be effective in the stirring operation. However, if desired, straight blades or blades of other configuration may be used.

Any suitable means for evacuating the chamber may be employed. As shown more clearly in Fig. 2, casing 10 is provided with an outlet pipe 56 leading to suitable suction apparatus (not shown).

Operation

Figure 6:
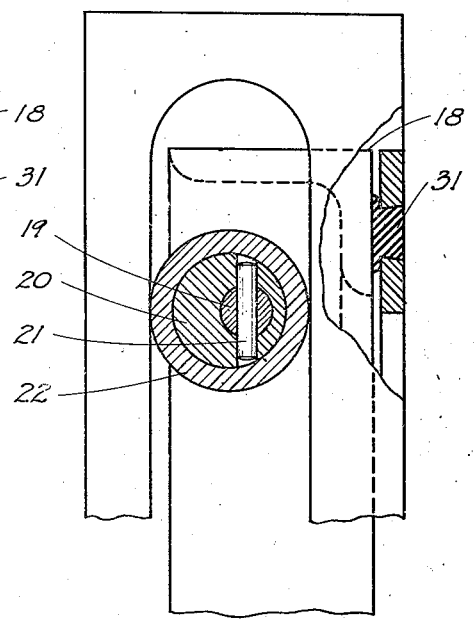

In the operation of the apparatus, the levers 26 are thrown so as to release the door 18 and permit it to be raised to the open position shown in Fig. 1. The motor is then operated to bring the blades 47 to the raised position shown in Figs. 2 and 3, thus providing an open space for the introduction of a truck below. The desired position of the blades is indicated by the arrow 55 carried at the outer end of shaft 54. The truck bearing a load of ground meat is then pushed through the door opening 12 and into engagement with the rollers 44 which direct it into the proper position below blades 47. Forward movement of the car 14 is stopped by the bumper 41. The door 18 is then pushed into lower position and the levers 26 swung so as to rotate the eccentrics 20. The rotation of the eccentrics 20 from the position shown in Fig. 5 to the position shown in Fig. 6 shifts the rods 19 from the open position shown in Fig. 5 to the sealing position shown in Fig. 6. This lateral movement of the rods 19 carries the door members 18 forward into engagement with the sealing strips 31, compressing the sealing strips 31, as shown in Fig. 6, and providing an airtight seal. The window opening 34, if it has not previously been closed, is now closed and sealed by the same operation. The motor and the suction apparatus are then set in operation. The rotation of shafts 45 causes the blades 47 to move into the body of ground meat and stir it, thus freeing under the influence of suction the entrapped air, vapors, gases, etc. After the treatment is complete, the motor is driven to bring the indicator arrow 55 to vertical position. The window closure 34 is lowered, and the operator removes any meat which is clinging to the agitator blades, allowing it to fall into the body of the car. Door 18 is then raised and the car removed.

The operation is simple, effective, and may be carried on in a modicum of time, the entire operation being accomplished without removing the comminuted meat from the truck in which it is carried.

While in the foregoing description, we have set forth certain specific details and steps, it will be understood that such details and steps may be varied widely by those skilled in the art without departing from our invention.

We claim:

1. In combination, a casing providing a chamber open at one end and adapted to receive a filled truck open at the top, a shaft supported upon bearings above said truck, agitator blades carried by said shaft and extending radially therefrom except at one side of said shaft to provide clearance space for the insertion and removal of said truck, means for rotating said shaft to bring said blades into contact with the contents of said truck to agitate the same, means for sealing said open end of the chamber, and means for drawing a partial vacuum in said chamber while said contents are being agitated.

2. In combination, a casing providing a chamber open at one end and adapted to receive a comminuted meat truck open at the top, agitating means supported upon a fixed horizontal axis above said truck and adapted to move into the interior of said truck to agitate said meat, said agitating means being movable above said truck to permit the introduction and removal thereof, means for actuating said agitating means, means for sealing said open end of the chamber, and means for drawing a partial vacuum in said chamber while said meat is being agitated.

3. In combination, a casing providing a chamber open at one end and adapted to receive a filled truck open at its top, a shaft supported upon bearings in fixed vertical relation with respect to said truck, blades extending from only one side portion of said shaft and adapted when rotated to enter and agitate the contents of said truck, means for rotating said shaft, means for sealing the open end of said chamber, means for guiding said truck into a space below said blades, and means for drawing a partial vacuum in said chamber while the contents of said truck is being agitated.

4. In combination, a casing providing a chamber open at one end and adapted to receive a filled roller truck open at its top, a drive shaft supported above said truck in fixed vertical relation with respect thereto, blades carried by said shaft on one side thereof permitting said truck to move therebelow but extending, when said shaft is rotated, into the contents of said truck to agitate the same, means for sealing said open end of the chamber, and means for drawing a partial vacuum in said chamber while the contents of said truck is being agitated.

5. In a chamber open at one end and adapted to receive a filled truck open at its top, said chamber being provided with a slidable closure and eccentric means for sealing said closure in closed position, a shaft supported for rotation above said truck, blades carried by said shaft and extended radially from said shaft except on one side thereof, said blades extending from said shaft a distance slightly less than the distance between said shaft and the top of said chamber and when in upper position providing an open space therebelow through which said truck may enter or be removed from said chamber but extending into and agitating the contents of said truck when rotated into lower position, and means for drawing a partial vacuum in said chamber.

FRITZ A. LINDBERG.
ELMER R. LAIRD.